US008205551B2

(12) United States Patent
Begon et al.

(10) Patent No.: US 8,205,551 B2
(45) Date of Patent: *Jun. 26, 2012

(54) METHOD FOR TRANSFERRING A MICRON-SIZED PATTERN ONTO AN OPTICAL ARTICLE AND OPTICAL ARTICLE THUS OBTAINED

(75) Inventors: Cédric Begon, Charenton le Pont (FR); Christelle Defranco, Charenton le Pont (FR)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 1019 days.

This patent is subject to a terminal disclaimer.

(21) Appl. No.: 12/096,480

(22) PCT Filed: Dec. 6, 2006

(86) PCT No.: PCT/FR2006/002666
§ 371 (c)(1),
(2), (4) Date: Jun. 6, 2008

(87) PCT Pub. No.: WO2007/066007
PCT Pub. Date: Jun. 14, 2007

(65) Prior Publication Data
US 2008/0289517 A1 Nov. 27, 2008

(30) Foreign Application Priority Data
Dec. 8, 2005 (FR) .................................... 05 12485

(51) Int. Cl.
*B41M 1/30* (2006.01)
*G02C 7/04* (2006.01)

(52) U.S. Cl. ........................................ 101/483; 351/159
(58) Field of Classification Search .................. None
See application file for complete search history.

(56) References Cited

U.S. PATENT DOCUMENTS

| | | |
|---|---|---|
| 4,171,766 A | 10/1979 | Ruell |
| 5,634,669 A | 6/1997 | Colgate, Jr. |
| 5,892,600 A | 4/1999 | Kuo |
| 5,937,758 A | 8/1999 | Maracas et al. |

(Continued)

FOREIGN PATENT DOCUMENTS
DE 19644620 4/1998
(Continued)

OTHER PUBLICATIONS

Donald C. O'Shea, Thomas J Suleski, Alan D. Kathman, and Dennis W. Prather, *Diffractive Optics: Design, Fabrication, and Test;*, , p. 149-166 (2004).

(Continued)

*Primary Examiner* — Joshua D Zimmerman
(74) *Attorney, Agent, or Firm* — Occhiuti Rohlicek & Tsao LLP (57) ABSTRACT

The inventive method consists in transferring a pattern (P) onto the optical article (1) in the form of one or several portions of transferable material (3) retained by a pressure-sensitive adhesive material layer (2) and in applying transferable material portions with the aid of a pad by placing the adhesive material layer between the pad and a pattern receiving article. The use of the pressure-sensitive adhesive material makes it possible to use the different materials in the form of a transferable material. Said method is particularly suitable for producing patterns, in particular in the form of holograms on optical lenses, in particular ophthalmic lenses.

34 Claims, 2 Drawing Sheets

U.S. PATENT DOCUMENTS

| | | |
|---|---|---|
| 2003/0059565 A1* | 3/2003 | Otaki et al. .................. 428/40.1 |
| 2004/0086709 A1 | 5/2004 | Cunningham et al. |
| 2004/0115279 A1 | 6/2004 | Hansford et al. |

FOREIGN PATENT DOCUMENTS

| | | |
|---|---|---|
| DE | 19758395 | 7/1999 |
| DE | 19926698 | 12/2000 |
| DE | 10060531 | 6/2001 |
| EP | 0766103 | 4/1997 |
| EP | 1002640 | 5/2000 |
| EP | 1090971 | 4/2001 |
| FR | 2507196 | 12/1982 |
| JP | 4147180 | 5/1992 |
| JP | 7219435 | 8/1995 |
| WO | WO95/11945 | 5/1995 |
| WO | WO99/55790 | 11/1999 |
| WO | WO01/23921 | 4/2001 |
| WO | WO02/100656 | 12/2002 |
| WO | WO03/099953 | 12/2003 |

OTHER PUBLICATIONS

Hans Peter Herzig, *Micro-Optics: Elements, Systems and Applications*; p. 153-177 (1997).

"Survey of Fabrication Techniques for Diffractive Optical Elements," *Diffractive Optics* vol. No. TT 62 pp. 149-166.

Xia et al., "Soft Lithography," *Angew, Chem Int. Ed.* vol. No. 37, pp. 550-575 (1998).

Gale, "Replication," pp. 153-177.

Schmid et al., "Preparation of Metallic Films on Elastomeric Stamps and their Application for Contact Processing and Contact Printing," *Advanced Functional Materials* vol. 13, No. 2, pp. 145-153 (2003).

Loo et al., "Additive, Nanoscale Patterning of Metal Films with a Stamp and a Surface Chemistry Mediated Transfer Process: Applications in Plastic Electronics," *Applied Physics Letters* vol. 81 No. 3 pp. 562-564 (2002).

\* cited by examiner

METHOD FOR TRANSFERRING A MICRON-SIZED PATTERN ONTO AN OPTICAL ARTICLE AND OPTICAL ARTICLE THUS OBTAINED

CROSS-REFERENCE TO RELATED APPLICATIONS

This application is the National Stage of International Application No. PCT/FR2006/002666, filed on Dec. 6, 2006, which claims the priority of French Application No. 0512485, filed on Dec. 8, 2005. The contents of both applications are hereby incorporated by reference in their entirety.

The present invention relates to a method for transferring a micron-sized pattern onto an optical article, and also to an optical article that comprises such a pattern by using this method. It is particularly suitable for a product of the optical lens type, especially of the ophthalmic lens type. This method is very advantageous for introducing a holographic pattern, and more particularly an amplitude hologram onto such an optical article.

It may be necessary to print a given micron-sized pattern onto a finished product or during manufacture, especially for decorative purposes, in order to indicate a trade mark of the product or to prevent possible counterfeiting of the product, for example.

In order to do this, several printing processes have been developed, which are designated overall by soft-lithography processes, as opposed to the lithographic processes used conventionally for manufacturing integrated electronic circuits. Whereas the latter were based on the selective irradiation and dissolution of portions of a resin mask according to a given pattern, the soft-lithography processes use a stamp, the surface of which has a microrelief formed from hollows and protuberances. This microrelief defines the pattern to be reproduced on the product. The pattern is reproduced on one side of the product by application of the stamp, under conditions which are adapted as a function of the material present at the surface of the product. The term "pattern" denotes the geometric arrangement of the surface portions of the protuberances which are in contact with the surface of the product when the stamp is applied.

In the soft-lithography process known as micro-contact printing, the side of the product is covered with a metallic layer and the stamp is coated with a substance capable of protecting the metallic layer during an etching step. During application of the stamp to the side of the product, some of the substance is selectively transferred from the stamp to the metallic layer at locations which correspond to the protuberances of the stamp. The metallic layer is then only etched at the locations of this layer which correspond to the hollows of the stamp. However, it is necessary to use a substance which forms a self-assembled molecular layer on the metallic layer in order to obtain a satisfactory printing quality. For this, the metallic layer must be free of pollution and be formed from a metal that is not very likely to be subject to a possible chemical surface alteration, such as an oxidation. In practice, only gold, platinum and silver make it possible to obtain a satisfactory printing quality. Such a choice of the material which forms the printed pattern is particularly limited, and may be incompatible with other constraints of the product, such as its cost. Moreover, such a method takes a long time to carry out, especially due to the step of etching the metallic layer which is generally carried out using a liquid solution of an etching agent.

Document JP 07/219,435 describes a method for manufacturing a hologram seal, according to which a hologram composed of hollows and protuberances is first etched at the surface of a thermoplastic material, then covered by a metallic layer. However, in such a method, it is difficult to limit the metallic layer to the portion of the surface which is occupied by the hologram.

One objective of the present invention is to provide a method for transferring, according to a given pattern, a material composed of a thin film or of a stack of materials composed of thin films, a method that is simple to implement and compatible with a large number of materials. The present invention should especially allow the selective transfer of a material onto an optical article according to a pattern having a definition on the micron-sized, or even submicron-sized scale, such a pattern advantageously forming a hologram. The expression "selective transfer" is understood to mean a transfer which geometrically only concerns the material borne by the protuberances of the stamp.

Generally, within the meaning of the invention, the use of the term "micron-sized" encompasses both a micron-sized pattern having a definition on the scale of the size of a micron, and a submicron-sized pattern having a definition on the scale below the size of a micron, i.e. on the scale of a hundred or so or even fifty or so nanometers.

For this, the invention provides a method for transferring a micron-sized pattern, such as defined previously, onto a surface of an optical article which comprises the following steps:

/a/ depositing a layer of at least one transferable material onto a surface of a stamp having hollows and protuberances forming the microrelief, of micron-sized or submicron-sized definition, corresponding to the pattern to be transferred;

/b/ depositing a layer of a pressure-sensitive adhesive (PSA) onto the surface of the substrate of the optical article;

/c/ bringing the surface of the stamp which comprises the layer of transferable material into contact with the layer of pressure-sensitive adhesive;

/d/ applying a pressure to the stamp; and

/e/ moving the stamp away from the surface of the optical article comprising the layer of pressure-sensitive adhesive.

Figures 1A, 1B:
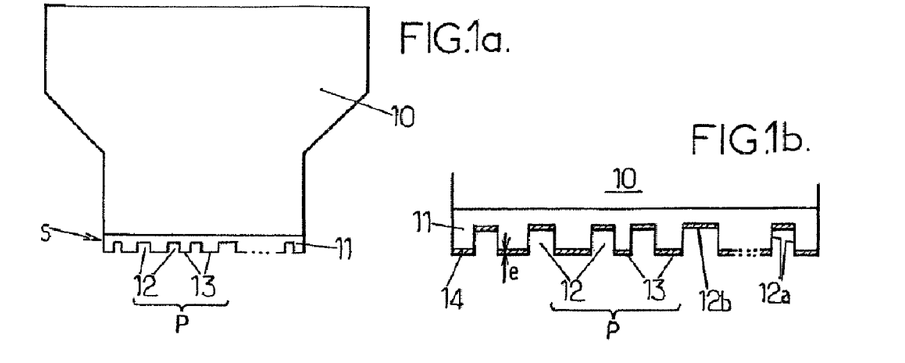
FIGS. 1a and 1b are cross-sectional views of a stamp used in a method for transferring a pattern according to the invention.

According to the invention, the layer of transferable material deposited onto the microrelief of the stamp during step /a/ does not generally follow, in a true manner, the microrelief. The layer is preferably present over the zones of the microrelief which marry up with planes orthogonal to the main direction in which the deposition of material is carried out. These zones are borne by the protuberances (13) or the hollows (12b) of the stamp, as indicated in FIG. 1b.

Within the context of the method, the expression "optical article" is understood to mean an article chosen from an optical instrumentation lens, a sight lens, a visor and an ophthalmic lens.

According to the invention, advantageously, the method for transferring a micron-sized pattern to a surface of an optical article is a method of selective transfer. Such a selective transfer especially allows the production of an amplitude hologram with an excellent resolution.

Thus, the surface of the stamp is applied to the surface of the optical article coated with a layer of pressure-sensitive adhesive (PSA) under suitable conditions so that the layer of transferable material located on the protuberances of the surface of the stamp is selectively transferred to the PSA surface deposited on the optical article that has been brought into contact with said stamp.

One method according to the invention is therefore of the soft lithography type and therefore has specific advantages. In particular, the method does not comprise any etching step since the portions of the layer of transferable material which are initially situated in the hollows of the surface of the stamp are not brought into contact with the layer of adhesive material, and therefore are not transferred to the surface of the PSA. This method is accurate, and has the advantage of being non-polluting, since no chemical etching step is necessary.

The use of a PSA in this type of method is particularly advantageous. This is because all PSAs have in common the fact of having a permanent adhesive property (known as tack or tackiness) and a low elastic modulus at ambient temperature, typically between 1 and 107 Pa (Pascals). It is observed that the adhesion mechanism brought into play with such an adhesive material does not involve chemical bonding but exploits the particular viscoelastic properties of the PSA material. These properties intrinsic to each PSA formulation make it possible, in particular, to establish electrostatic van der Waals interactions at the bonding interface. This is what takes place when the PSA is brought into contact with a solid material with a pressure—the pressure applied and the low modulus of the PSA material making it possible to guarantee an intimate contact of the PSA on the molecular level with the topology of the material to be bonded. Moreover, the bulk viscoelastic properties of the PSA make it possible to dissipate, in the thickness of the adhesive layer, the energy brought about by mechanical stresses of the bonding interface, and therefore to withstand delamination mechanisms.

In the method according to the present invention, the permanent adhesive property of the PSA at the surface of the optical article makes it possible to choose the moment when this function is used to ensure the transfer of the transferable material and its permanent and cohesive adhesion with the optical article. A control of the production line can then be envisaged due to this permanent adhesion property that the PSAs possess, but of which all the properties are only implemented after exerting a pressure between the PSA and the material to be transferred.

In the method according to the invention, a layer of pressure-sensitive adhesive material provides the adhesion, onto the surface of the optical article, of portions of the layer of transferable material which are transferred during the application of the stamp. Such an adhesion mechanism is compatible with a large number of transferrable materials, especially electrically conductive materials, and metallic, insulating, dielectric or refracting materials.

One advantage of the invention lies in the conditions for contacting the stamp coated with at least one layer of transferrable material onto the surface of the optical article coated with at least one layer of pressure-sensitive adhesive. These conditions are chosen so that only the portions of the layer of transferrable material which are located on the protuberances of the stamp are transferred to the PSA layer, at which level the contact is established. In particular, owing to the use of a pressure-sensitive adhesive material, the application pressure of the stamp to the optical article may be chosen from within an extended range of values. Among the conditions for contacting the stamp with the surface of the optical article, the method according to the invention is advantageously carried out under conditions such that the stamp has an approach parallel to the normal of the point of contact on the substrate of the optical article.

As mentioned previously, the pattern may be micron-sized or submicron-sized, the term "micron-sized" being used generally throughout the description to denote both these sizes of patterns. Thus, generally in the meaning of the invention, the expression "micron-sized pattern" is understood to mean a pattern comprising one or more individual patterns, each individual pattern having a size between 10 µm (microns) and 50 nm (nanometers), advantageously between 5 µm and 100 nm, and very advantageously between 3 µm and 150 nm.

The transferred pattern may be, in particular, a diffracting pattern when it is lit by a light beam. This may especially be a holographic pattern. Such a pattern is particularly suitable for making it possible to identify a product and/or to distinguish an original product from a counterfeit copy. More particularly, the method according to the invention is particularly suitable for introducing an amplitude hologram onto the optical article. The expression "amplitude hologram" denotes a holographic microstructure which preferentially affects the amplitude of the electromagnetic field at normal incidence. This is the case, in particular, for a hologram composed of an arrangement of transparent zones and opaque zones, which are also reflecting in the case where the opacity is obtained by a metal. A reading image corresponding to the hologram may then be visualized by transmission or by reflection of a light beam through the lens.

The pattern may also represent a logo or an inscription that is directly readable on the product. When the pattern is formed from a multitude of individual and identical patterns, it may be simultaneously of the holographic type and have a marking that is directly readable on the product.

The holographic pattern may also be of digital hologram type, that is to say a computer-generated hologram (usually denoted by the acronym "CGH"). In such a case, the holographic pattern may be formed from an assembly of contiguous pixels, each pixel having a surface area between 0.2 $\mu m^2$ and 25 $\mu m^2$, advantageously between 0.2 $\mu m^2$ and 4 $\mu m^2$. Preferably, the pattern will comprise a large number of pixels, for example a total number greater than 10 000 pixels, thus making it possible to obtain, by reconstruction under illumination, an image having a sufficient resolution.

The transferred pattern may occupy a reduced part of one side of the product, especially in order not to mask the product itself or in order not to disrupt a subsequent use of the product. In such a configuration, it may be advantageous to deposit a pressure-sensitive adhesive layer onto a surface area of the substrate that is substantially equal to the surface area of the pattern. In such a configuration, the pattern will preferably occupy one part of the side of the optical article that is less than 25 $mm^2$.

Alternatively, the transferred pattern may occupy the entire side of the optical article, especially when it comprises a grid of micron-sized or submicron-sized wires. Such a pattern that occupies the entire side of the article may be produced in order to obtain an antistatic function at the surface of the optical article, in order to produce a set of electrodes of a display matrix or else a filtering function by polarization of light reflected or transmitted by the optical article. In the latter case, the polarizing effect is obtained by transferring a pattern of parallel conductive wires (wire-grid polarizer).

Advantageously, a surface treatment of the optical article may be carried out before placing the adhesive layer on the surface of said optical article. This treatment is especially chosen from a chemical, thermal, plasma or corona treatment. This surface treatment may especially comprise a chemical treatment consisting of cleaning the surface of the optical article with isopropanol and/or water. Thus, dust or soiling possibly present on this surface may be removed.

The adhesive layer may, within the context of the invention, be deposited by a spin-coating process, a process that is well integrated, especially in ophthalmic lens production lines. It may also be deposited by other deposition techniques such as spraying, or a jet of material through the nozzles of an ink-jet printing head.

The layer of pressure-sensitive adhesive material may also be prepared initially in the form of a film of controlled thickness borne by at least one protective sheet, and preferably one protective sheet on each side of the film. The adhesive layer may thus be applied to the surface of the article in the form of film after removal of one protective sheet. After this application, the second protective sheet may then be peeled off so as to reveal the layer of adhesive material on the surface of the article. This protective sheet is commonly called a "liner".

According to the invention, the layer of pressure-sensitive adhesive material has a constant thickness over the surface of the optical lens. This equal thickness makes it possible to guarantee the optical quality of the final product. This thickness is between 0.5 µm and 300 µm, advantageously between 5 µm and 100 µm, and very preferably between 10 µm and 50 µm, especially in the case where the optical article is an ophthalmic lens. The layer must be optically transparent. Its degree of transmission may be variable, especially in the case of a tinted layer, but it must not diffuse, nor diffract, nor modify the perception of an object observed via transparency through the optical article comprising such a layer of adhesive material.

The method may additionally comprise the following step, which is carried out after step /a/ and/or step /e/:
/f/ covering the surface of the article with one or more functionalized coatings.

These functionalized coatings may be deposited in the form of a single-layer or multilayer film or lacquer, by any deposition means such as, for example, dip coating, spin coating, spraying or a jet of material through the nozzles of an ink-jet printing head. They are advantageously chosen from coatings that have a functionality of the impact resistance, abrasion resistance, antireflection, antisoiling, antifogging, antistatic, polarizing, coloring and photochromic type.

According to one preferred embodiment of the invention, the method thus comprises a supplementary step which is carried out after step /e/ and which consists in covering the surface of the article with at least one functionalized coating on top of the transferred pattern and the layer of adhesive material.

Such an upper coating is held on the optical article by the layer of adhesive material outside of the transferred pattern, and between the portions of the layer of transferrable material which have been transferred using the stamp. This coating, in addition to its functionalization, advantageously forms a protective coating for the transferred pattern.

The transferrable material may be a metallic material such as, for example, gold, aluminum, chromium, silver, copper, nickel, platinum, palladium or an alloy comprising at least one of these metals. In this case, the layer of transferrable material may advantageously be deposited in step /a/ onto the surface of the stamp by vacuum evaporation or by sputtering. Generally, it has been possible to observe that the shorter the time between the deposition of the metallic layer onto the stamp and the implementation of step /c/, the better the transfer of said metallic layer to the adhesive is. This is explained, in particular, by an absence of contamination of the metallic layer which impairs the quality of the adhesion.

Alternatively, the layer of transferable material may comprise a stack of several layers of respective materials. The material of at least one of the layers of the stack may then be refracting. In this case, visual display of the transferred pattern may also partially result from an interference behavior of a light beam used to illuminate the pattern. This transfer of a stack of several material layers may thus result, depending on the thickness of said stack, in the production of a hologram which very substantially affects the phase of the electromagnetic field at normal incidence. Such a transfer thus makes it possible to approach the conditions for producing a phase hologram. The expression "phase hologram" denotes a holographic microstructure which preferably affects the phase of the electromagnetic field at normal incidence.

The present invention especially makes it possible to envisage the use of numerous metals or alloys. This is because, in techniques such as micro-contact printing, the choice of materials that can be used is conditioned by their ability to create chemical interactions with the materials having to receive them. In the present case, the material to be transferred establishes, with the pressure-sensitive adhesive, physical interactions that are much more independent of the chemical nature of said adhesive.

According to one improvement of the invention, the pressure-sensitive adhesive material may comprise components that have an optical function. Such an optical function may be, in particular, a photochromic function or a coloration.

The invention also provides an optical article which comprises a pattern transferred to the surface of the latter using a method such as described previously. This article may comprise an optical lens, especially an ophthalmic lens, and in particular such a lens which is suitable for being assembled into a frame of a pair of spectacles. Such a lens then itself comprises:
  a base lens comprising at least one organic or mineral substrate;
  a layer of a pressure-sensitive adhesive material, which has a substantially uniform thickness along the surface of the base lens; and
  portions of a transferable material that form the transferred pattern, by adhesion onto the base lens via the layer of adhesive material.

The base lens especially comprises an organic substrate. The term "substrate" is understood to mean the base constituent transparent material of the optical lens and more particularly of the ophthalmic lens. This material serves as a support for the stack of one or more coatings, and helps to create the corrective function of the lens in the case of a corrective ophthalmic lens. In the case where the article is an ophthalmic lens, substrates of the following types are, for example, suitable: polycarbonates; polyamides; polyimides; polysulfones; polyethylene terephthalate/polycarbonate copolymers; polyolefins, especially polynorbornenes; diethylene glycol bis(allyl carbonate) polymers and copolymers; (meth)acrylic polymers and copolymers, especially polymers and copolymers of (meth)acrylic derivatives of bisphenol A; thio(meth)acrylic polymers and copolymers; urethane and thiourethane polymers and copolymers; epoxy polymers and copolymers and episulfide polymers and copolymers. In certain cases, the substrates may be colored directly in the bulk.

Between the organic substrate and the layer of adhesive material, one or more coatings may optionally be present. These coatings are especially functionalized coatings such as described previously.

Given that the lens is predominantly transparent, when the pattern is of holographic type, it may be adapted to form a reading image when a light beam is sent through the lens to the location of the pattern.

Other features and advantages of the present invention will appear in the description below of a nonlimiting implementation example, with reference to the appended drawings in which.

For reason of clarity, the dimensions of the various elements represented in these figures are not in proportion with the actual dimensions or ratios of dimensions. Furthermore, in all the figures, identical references correspond to identical elements.

The invention is now described within the context of the selective transfer of a holographic pattern onto an ophthalmic lens so as to produce an amplitude hologram on said lens. In this description, individual steps of the method of the invention which are known individually from existing methods are not repeated in detail. It only sets out to describe a succession of individual steps which make it possible to produce a transfer according to the invention.

In accordance with FIG. 1a, a stamp comprises a base 10 and a membrane 11. The membrane 11 has a surface S bearing the pattern and is attached to the base 10 by its face opposite the surface S. The surface S bearing the pattern has hollows 12 and protuberances 13 which correspond to two different values of the thickness of the membrane 11. The hollows 12 and the protuberances 13 form a micron-sized microrelief, which defines the pattern denoted by P. P denotes the geometric arrangement of the surface portions of the protuberances intended to be brought into contact with the surface of the optical article. The membrane 11 may be based on polydimethylsiloxane (PDMS). In this way, the stamp is based on PDMS at least at the location of the protuberances 13 of the surface S of the stamp. Such a material has a low surface energy, which is favorable for obtaining a good transfer quality. This low surface energy of the constituent material of the membrane and also its soft nature characterized by its elastic modulus is an important condition as it guarantees a perfect contact between the adhesive layer and the portions of transferrable material borne by the protuberances 13 of the surface S of the stamp, and also guarantees that the transferrable, especially metallic, layer is easily detached from the stamp in order to adhere to the adhesive layer. By way of indication, the commercial PDMS known as SYLGARD 184 (Dow Corning) has an elastic modulus of 2.5 MPa (megapascals). Other materials, in particular of elastomeric material type, may also be suitable for the membrane 11. The hollows 12 and the protuberances 13 may be formed in different ways. For example, a liquid containing precursor monomers of the elastomer may be poured into a membrane mold equipped with the pattern P, then polymerized inside the mold by heating or by irradiation with UV light. The membrane 11 which is obtained after demolding is attached to the base 10. For a membrane 11 produced in this way, the hollows 12 and the protuberances 13 may have dimensions between 10 microns and 50 nanometers, for example, measured parallel to the membrane 11. The depth of the hollows 12 may be from 0.1 micron to 30 microns, advantageously from 0.1 to 10 microns. Thus, the hollows 12 and the protuberances 13 definitely form a microrelief which defines the micron-sized pattern P.

The surface S may be deformed when it is applied against the receiving surface, (in the present case, the surface of an optical lens equipped with at least one PSA layer), as a function of the curvature of the latter. This deformation may result from a crushing of the membrane which varies along the surface S, and/or from a variable retraction of the membrane when it is attached to the base 10 in an appropriate manner.

FIG. 1b is an enlarged view of the membrane 11. A layer 14, for example made of gold or aluminum, is deposited on the membrane 11 and is distributed over the zones of the microrelief (12b and 13) which constitute planes orthogonal to the main direction in which the deposition of material is carried out. The layer 14 may have a thickness e of 30 nanometers, for example. It may be deposited on the surface S in several ways, especially by vacuum evaporation of an amount of gold or aluminum contained in a crucible and heated by the Joule effect.

Figures 2A, 2B:
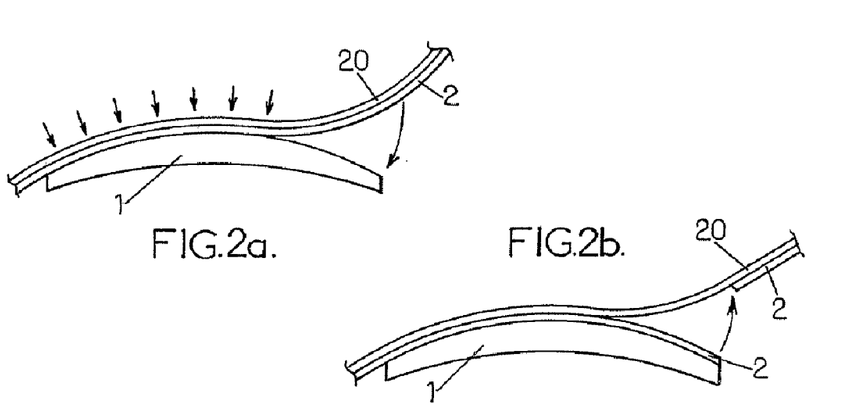
FIGS. 2a to 2d illustrate subsequent steps of this method.

In accordance with FIG. 2a, an ophthalmic lens which is initially formed from a base lens 1, has, for example, a convex front face and a concave rear face. In the following, the pattern P is transferred to the front face of the lens, but it is understood that a similar transfer may be carried out on the rear face. Thus, the invention is particularly suitable for transferring a pattern to a pseudo-spherical surface. Within the context of the invention, the expression "pseudo-spherical surface" is understood to mean a continuous concave or convex surface, that is to say one free of holes or steps. In general, at least one of the two faces of an optical lens is pseudo-spherical, so that the variation in thickness of the lens which results therefrom gives it an optical power. Afocal, unifocal, bifocal, trifocal and progressive or varifocal ophthalmic lenses all have at least one pseudo-spherical face. A spherical surface corresponds to one particular case of a pseudo-spherical surface, for which the radii of curvature of the surface along two perpendicular directions are equal. In the following, the expression "pseudo-spherical surface" is understood as including the particular case of spherical surfaces.

The ophthalmic lens 1 may be of any type as described previously. The expression "ophthalmic lens" is understood to mean lenses that are suitable, in particular, for a spectacle frame and that have the role of protecting the eye and/or correcting the vision.

Preferably, the surface of the lens 1 which is intended to receive the pattern P is first cleaned. For this, the lens may be subjected to a corona treatment or to a plasma treatment, but a method of cleaning using one or more detergent and/or rinsing solutions may also be used.

A layer of a pressure-sensitive adhesive material, reference 2 in FIGS. 2a-2d, is applied to the front face of the lens 1. According to one method of applying the layer of adhesive material which is particularly advantageous, this layer is initially present in the form of a continuous film enclosed between two peelable films (or liners). A first of the liners is peeled off, then the side of the film of adhesive material which is thus exposed is applied against the front face of the lens 1 (FIG. 2a). During this step, the film 2 protected by the second peelable liner is pressed against the lens 1, the pressure being exerted at the surface of the second peelable liner, referenced 20. Once the film 2 is applied over the entire front face of the lens 1, the second liner 20 is in turn peeled off (FIG. 2b). The film of adhesive material is thus transferred to the lens 1, completely covering the front face of this lens. Such a method of depositing the adhesive layer 2 onto the lens 1 is advantageous in that it does not use any liquid phase. It may then be carried out rapidly without expensive equipment, in a manner that is compatible with a large number of transfers carried out successively.

Due to the use of a pressure-sensitive adhesive material, the front face of the lens 1 which is covered by the layer 2 has a permanent tack. In a known manner, this tack originates from a specific electrostatic and Theological behavior of the material of layer 2. Several pressure-sensitive adhesive materials may be used to form the layer 2 and especially PSAs chosen from the family of polyacrylates, the family of styrene-based block copolymers, and mixtures based on natural rubber, advantageously from the family of polyacrylates. More particularly, mention may be made, by way of example and in a nonlimiting manner, of PSAs of general compositions based on polyacrylates, polymethacrylates, based on ethylenic copolymers such as ethylene/vinyl acetate, ethylene/ethyl acrylate and ethylene/ethyl methacrylate copolymers, PSAs based on synthetic rubbers and elastomers including silicones, polyurethanes, styrene-butadienes, polybutadienes, polyisoprenes, polypropylenes, polyisobutylenes, PSAs based on nitrile or acrylonitrile-based polymers, PSAs based on polychloroprene, PSAs based on block copolymers comprising polystyrene, polyethylene, polypropylene, polyisoprene, polybutadiene, such as styrene-isoprene-styrene, PSAs based on polyvinyl-pyrrolidone/vinylpyrrolidone copolymers and also compositions or blends (having continuous or discontinuous phases) of the aforementioned, and also block copolymers obtained from the aforementioned. These PSAs may also comprise, within their formulation, one or more additives chosen, in particular, from tackifiers, plasticizers, binders, antioxidants, stabilizers, pigments, dyes, dispersing agents and diffusing agents.

Figures 2C, 2D:
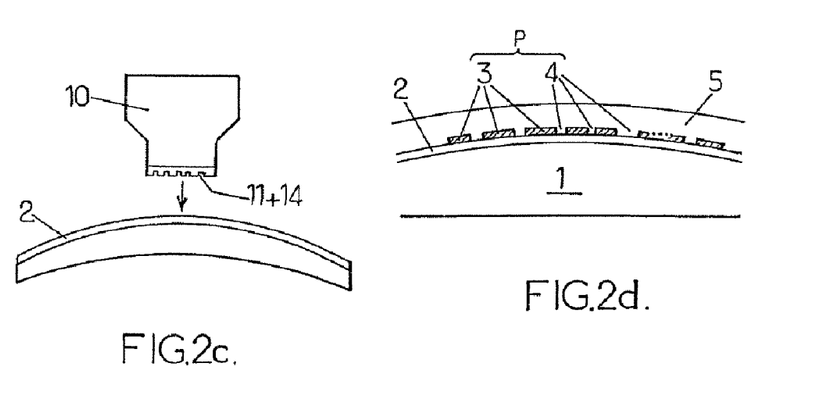

The surface S of the stamp, and more specifically the protuberances 13 and the hollows 12b, which bears the metallic layer 14 is then applied against the front face of the lens 1 covered by the layer 2. For this, the stamp is brought closer in a direction substantially perpendicular to the face of the lens (FIG. 2c). The application is carried out with a sufficient pressure to obtain a good cohesion of the metallic layer 14 with the layer 2 of adhesive material, at the protuberances 13 of the surface S. Moreover, this pressure is not too high in order to prevent the adhesive material of layer 2 from penetrating into the hollows 12 during the application. In other words, the protuberances 13 of the surface S do not penetrate into the layer 2. In this way, only the portions of the metallic layer 14 which are initially located on the protuberances 13 come into contact with the adhesive layer 2. When the stamp is removed, these portions of the layer 14, referenced 3 in FIG. 2d, remain selectively bonded to the lens 1. They have shapes which reproduce those of the protuberances 13 of the surface S of the stamp, parallel to the surface of the lens, so that the pattern P is transferred to the lens 1. The material of the layer 14 therefore has a role of material for transfer of the pattern P to the lens 1. The portions of the layer 14 which are located in the hollows 12 (and specifically in the zones 12b) of the surface S are removed with the stamp when it is separated from the lens 1, since they have not come into contact with the layer 2 of adhesive material. Intervals free of metallic material, referenced 4 in FIG. 2d and which correspond to the hollows 12 of the surface S, thus separate the portions 3 on the front face of the lens 1. Such a transfer is denoted as selective within the context of the invention. The inventors have observed that application pressures of the stamp to the lens 1 which are between 0.25 and 70, preferably between 0.25 and 10, grams per square millimeter of surface area of the protuberances give very satisfactory transfer qualities. Moreover, the use of a pressure-sensitive adhesive material allows some scope as regards the application time of the stamp against the lens 1.

The selectivity of the transfer is directly linked to the force applied to the stamp during the stamp-adhesive layer contact. That is to say $F_a$, the limiting value of this force F for which the adhesive layer withstands the driving in of the stamp. This value is also linked to the mechanical properties of the PSA layer. To carry out a high-quality selective transfer, it is necessary, within the context of the invention, that the force F applied be less than the force $F_a$. In other words, the force F applied must be low enough in order not to make the pressure-sensitive adhesive penetrate into the hollows of the pattern borne by the stamp. Most particularly, the force applied must be low enough to prevent the adhesive from coming into contact with the top of the hollows that are coated with a layer of transferable material, and high enough to guarantee the cohesion of the transfer of the metallic layer from the stamp to at least one part of the surface of the PSA. Naturally, in addition to the factors influencing the selectivity of the aforementioned transfer, a person skilled in the art easily understands that the size of the pattern, namely the distance between the hollows and the protuberances and more particularly the height of the hollows, are parameters which may also influence the quality of the transfer.

It is therefore important to be able to estimate, for a given adhesive material, the limiting force starting from which the adhesive material begins to penetrate into the hollows of the pattern. The pressure applied is an important parameter, but it is necessary to also take into account the modulus of the material forming the stamp, the modulus of the PSA itself, the tack of the PSA and also the thickness of the PSA deposited on the optical article. A judicious compromise between these various parameters is necessary in order to guarantee a selectivity for transferring the pattern from the stamp to the optical article, both in its resolution and in its optical quality.

In order to protect the pattern transferred to the lens, an upper layer 5 (FIG. 2d), which may be a protective film for example, is applied to the front face of the lens 1. This film 5 covers the portions 3 of the transferred pattern P and is held on the lens 1 by the layer 2 of adhesive material outside of the pattern P. Such an upper layer may additionally have an optical function such as, for example, a function of polarizing, absorbing, coloring or filtering light which passes through the lens 1. It may also protect the pattern transferred to the lens with an abrasion-resistant layer, that is to say with a primer layer, that improves the impact resistance of the article, onto which it is possible to deposit an abrasion-resistant layer, the primer layer also improving the anchoring of this abrasion-resistant layer. It is also possible to deposit, onto the abrasion-resistant layer, an antireflection coating and finally it is also possible to coat this antireflection coating with a hydrophobic and oleophobic antisoiling coating. An antistatic coating may also be present. The various combinations in the deposition of these layers are well known in the treatment of ophthalmic lenses.

Figure 3:
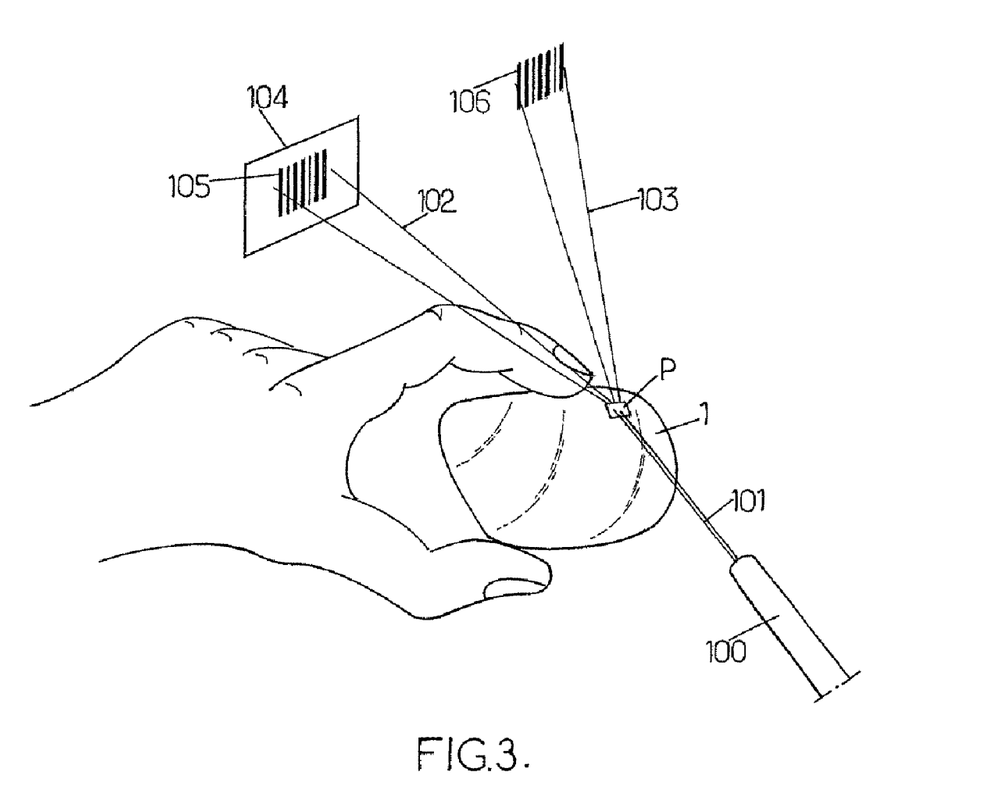
FIG. 3 illustrates a step of reading a transferred holographic pattern according to the invention.

In the case where the transferred pattern constitutes a holographic diffractive structure, a reading image diffracted by the hologram and restoring the information that it contains may then be visualized by transmission or by reflection of a light beam through the lens 1, at the location of the transferred pattern P. For this, in accordance with FIG. 3, the holographic pattern P is lit by a low-power laser point 100, for example of red color and having a wavelength of 645 nanometers. In a known manner, the distance between the laser 100 and the pattern P is not critical for reconstruction of the image. The light beam 101 from the laser 100 is diffracted by the pattern P, so that it is divided into at least two secondary beams 102 and 103 after having passed through the lens 1. Each of the two beams 102 and 103 reconstructs an image at a distance from the lens 1 which may be between 20 and 50 centimeters, for example. This image is revealed by placing an object 104 that acts as a screen over the path of one of the two beams 102 or 103. Due to the fact that the light used is derived from a laser, the object which serves as a screen may be any object. Optionally, the image may also be projected onto an image sensor, for example, of CCD (charge coupled device) type or CMOS (complementary metal oxide semiconductor) type, in order to allow a rapid and accurate recognition. In FIG. 3, the images which correspond to each of the two beams 102 and 103 are referenced 105 and 106 respectively. They correspond to two opposite diffraction orders, for example +1 and −1, so that the two images 105 and 106 are reversed relative to one another. The image which is not reversed, or "direct image" corresponds to the +1 diffraction order and is the reading image of the holographic pattern P.

The ophthalmic lens 1 may be intended to be assembled in a frame of a pair of spectacles. In order not to disturb the vision of a wearer of the spectacles, the pattern P may be of small dimensions and in the vicinity of one edge of the lens 1 (FIG. 3). For example, the transferred pattern P may occupy a part of the face of the lens 1 which is less than 25 mm². The pattern may also be introduced over a part of the lens said to be cut out. In this case, the pattern is mainly introduced for the purpose of traceability of the final product. Such a configuration is particularly advantageous when the pattern transferred corresponds to a computer-generated hologram of CGH type which is made up of pixels. Such a hologram may thus contain a very large amount of information over a very small space advantageously between 15 mm² and 0.5 mm², making it possible, for example, to guarantee complete traceability of the product in the production line and logistics chain.

Alternatively, the transferred pattern P may occupy the entire front face of lens 1, for example when it gives the lens a particular optical function. This may be the case, in particular, when the transferred pattern P is made up of a set of wires that are electrically conductive and parallel to a given direction, in order to filter the light which passes through the lens as a function of a polarization of this lens. Typically, the conductive wires have a width of a few tens of nanometers and are spaced in pairs a few tens of nanometers apart.

Numerous modifications of the transfer method which has been described in detail above may be introduced, while retaining some, at least, of the advantages of the invention. For example, an intermediate layer may be deposited onto the membrane 11 of the stamp before the layer 14 of transferable material, in order to adjust a surface energy between the layer 14 and the membrane 11 of the stamp. Such an adjustment may further improve the transfer of the portions 3 of transferable material to the lens 1. Furthermore, the pattern transferred to the lens may be a diffracting pattern, that is to say whose visibility results from a diffraction of the light through the portions 3 and/or the intervals 4 present between these portions. Finally, the pattern which is transferred may be visible under ambient lighting conditions, or when it is lit by a laser beam.

EXAMPLE

1. Adhesive Layer (2)

The pressure-sensitive adhesive PSA (2) used was a commercial product from Nitto Denko having the commercial reference CS9621. It was a film of modified acrylic-based adhesive material having a thickness of 25 μm, packaged between two protective sheets, each protective sheet covering the whole of each side of the PSA film.

The adhesive layer was bonded to the convex face of an ophthalmic lens based on ORMA® (Essilor), having a convex 120 mm radius of curvature, using a device comprising a vacuum module and a silicone stamp. The lens was positioned inside the vacuum module on a lens holder. The vacuum module was surmounted by a snap-fastening device that made it possible, on the one hand, to seal said vacuum module and, on the other hand, to hold the PSA. A specific sequence of putting the vacuum module and the stamp into operation made it possible to carry out the lamination of the PSA over the lens that had a curved surface. Such a device and also its method of implementation is especially described in Patent Application FR 05 03306.

2. Pattern to be Transferred (3)

The method cited in example was optimized for a digital holographic pattern composed of individual square pixels having a side dimension of 1 μm (micron).

In order to do this, the membrane 11 of the stamp bore, at its surface, a microrelief consisting of hollows 12 and protuberances 13 of rectangular profile as shown schematically in FIG. 1A. The depth of the microrelief (difference in height between the hollows 12b and the protuberances 13) was 1 μm.

The holographic pattern had features such that the width of the protuberances of the microrelief borne by the membrane 11 and measured along an axis parallel to one edge of the square pixels varied between 1 μm and 85 μm depending on the zone of the stamp in question.

3. Stamp Bearing the Pattern (11) (FIG. 1a)

The microrelief defining the pattern to be transferred was molded in SYLGARD® 184 (Dow Corning) (11). The properties of this material after polymerization at 100° C. for 1 hour were the following:
surface energy: 22 mN/m; and
Young's modulus: 2.5 MPa.

4. Metallic Layer (14)

The metallic layer was obtained by vacuum evaporation. The appropriate metallic material was placed in a crucible and heated by the Joule effect. The evaporation was carried out on the stamp made of SYLGARD® 184 that had not undergone any prior surface preparation.

In the case of gold, a layer with a thickness of 30 nm was obtained by evaporating gold having a purity of 99.9%.

In the case of aluminum, a layer having a thickness of 30 nm was obtained by evaporating aluminum shot having a purity of 99.5%.

The evaporation of the metallic layer took place on the same day as the transfer step onto the ophthalmic lens.

5. Transfer (FIG. 2c.)

The stamping was carried out at right angles to the surface.

The optimal stamping pressure was obtained empirically, for a 30 nm layer of gold or of aluminum, on the Nitto CS9621 PSA. The optimal pressure, to produce an effective amplitude hologram corresponding to a selective transfer of the gold or aluminum present on the protuberances of the stamp onto the film of pressure-sensitive adhesive, was between 0.5 g/mm² and 4.5 g/mm². The surface area taken into account for the pressure calculation was that of the protuberances 13 making up the pattern P.

The table below presents the results of various conditions tested:

| Pressure applied to the stamp | Result |
|---|---|
| 1 g/mm² | Perfectly selective transfer |
| 1.5 g/mm² | |
| 3.8 g/mm² | Selective transfer, with some |

| Pressure applied to the stamp | Result |
|---|---|
| defective zones | |
| Selective transfer limit: P = 4.5 g/mm² | |
| 4.6 g/mm² | Complete transfer |
| 6.1 g/mm² | |

Pressures Applied for the Example of the Selective Transfer of Gold:

The pressure applied for the stamping of the stamp onto the convex face of an ophthalmic lens (having a 120 mm radius of curvature) covered with a layer of Nitto Denko CS9621 PSA (having a thickness of 25 µm) was 1.5 g/mm². The transfer of the 30 nm gold layer was selective; the hologram obtained was an amplitude hologram.

Another example of the transfer technique was obtained by replacing the Nitto Denko CS9621 PSA (having a thickness of 25 µm) by the Nitto Denko HJ9150 PSA having a thickness of 50 µm. All the other parameters remained identical to the example cited above.

Pressures Applied for the Example of the Selective Transfer of Aluminum:

The pressure applied for the stamping of the stamp onto the convex face of an ophthalmic lens (having a 120 mm radius of curvature) covered with a layer of Nitto Denko CS9621 PSA (having a thickness of 25 µm) was 4 g/mm². The transfer of the 30 nm aluminum layer was selective; the hologram obtained was an amplitude hologram.

The invention claimed is:

1. A method for transferring a micron-sized pattern onto a surface of an optical article which comprises the following steps:
   /a/ depositing a layer of at least one transferable material onto a surface of a stamp having hollows and protuberances forming the microrelief, of micron-sized or submicron-sized definition, corresponding to the pattern to be transferred;
   /b/ depositing a layer of a pressure-sensitive adhesive onto the surface of the substrate of the optical article;
   /c/ bringing the surface of the stamp which comprises the layer of transferable material into contact with the layer of pressure-sensitive adhesive;
   /d/ applying a pressure to the stamp; and
   /e/ moving the stamp away from the surface of the optical article comprising the layer of pressure-sensitive adhesive.

2. The method as claimed in claim 1, according to which, during step /d/, the pressure applied to the stamp causes a selective transfer of the portions of the layer of transferable material, located on the protuberances of the surface of the stamp, onto the surface of the optical article.

3. The method as claimed in claim 1, in which the micron-sized pattern comprises one or more individual patterns, each individual pattern having a size between 10 µm and 50 nm, advantageously between 5 µm and 100 nm, and very advantageously between 3 µm and 150 nm.

4. The method as claimed in claim 1, according to which the transferred pattern is a diffracting pattern when said pattern is lit by a light beam.

5. The method as claimed in claim 1, according to which the transferred pattern is a holographic pattern.

6. The method as claimed in claim 5, according to which the transferred pattern is a holographic pattern of amplitude hologram type.

7. The method as claimed in claim 5, according to which the transferred pattern is a holographic pattern of digital hologram type formed from an assembly of contiguous pixels, each pixel having a surface area between 0.2 µm² and 25 µm², advantageously between 0.2 µm² and 4 µm².

8. The method as claimed in claim 1, according to which the transferred pattern occupies a reduced part of one side of the optical article.

9. The method as claimed in claim 8, according to which the transferred pattern occupies a part of the side of the optical article less than 25 mm².

10. The method as claimed in claim 1, according to which the transferred pattern occupies one entire side of the optical article.

11. The method as claimed in claim 10, according to which the transferred pattern comprises a grid of parallel, electrically conductive wires.

12. The method as claimed in claim 1, according to which the optical article is chosen from an optical instrumentation lens, a sight lens, a visor and an ophthalmic lens.

13. The method as claimed in claim 12, according to which the optical article is an ophthalmic lens chosen from an afocal, unifocal, bifocal, trifocal and progressive or varifocal lens.

14. The method as claimed in claim 12, according to which the holographic pattern is adapted to form a reading image when a light beam is sent through the lens at the location of said pattern.

15. The method as claimed in claim 1, according to which the layer of pressure-sensitive adhesive material is deposited on the surface of the optical article by a process of spin coating, spraying, or a jet of material from a printer.

16. The method as claimed in claim 1, according to which the layer of pressure-sensitive adhesive material is initially borne by at least one protective sheet, then is applied to the surface of the optical article through said sheet, and according to which said sheet is then peeled off so as to leave the layer of adhesive material on the surface of the optical article.

17. The method as claimed in claim 1, according to which the thickness of the layer of pressure-sensitive adhesive material is between 0.5 µm and 300 µm, advantageously between 5 µm and 100 µm, and very preferably between 10 µm and 50 µm.

18. The method as claimed in claim 1, additionally comprising the following step, which is carried out after step /a/ and/or step /e/:
   /f/ covering the surface of the article with one or more functionalized coatings.

19. The method as claimed in claim 18, according to which the functionalized coating has a functionality of the impact resistance, abrasion resistance, antireflection, antisoiling, antifogging, antistatic, polarizing, coloring or photochromic type.

20. The method as claimed in claim 18, according to which the supplementary step /f/ is carried out after step /e/.

21. The method as claimed in claim 1, according to which the transferable material is a metallic material.

22. The method as claimed in claim 21, according to which the transferable material is chosen from gold, aluminum, chromium, silver, copper, nickel, platinum, palladium and an alloy comprising at least one of these metals.

23. The method as claimed in claim 21, according to which the layer of transferable material is deposited in step /a/ onto the surface of the stamp by vacuum evaporation or by sputtering.

24. The method as claimed in claim 1, according to which the layer of transferable material comprises a stack of several layers of respective materials.

25. The method as claimed in claim 24, according to which the material of at least one of the layers of the stack is refracting.

26. The method as claimed in claim 1, according to which the stamp is based on polydimethylsiloxane at least at the location of the protuberances of the surface of the stamp.

27. The method as claimed in claim 1, according to which the stamp has an approach parallel to the normal of the point of contact on the substrate of the optical article.

28. The method as claimed in claim 1, according to which the surface of the stamp is suitable for being deformed during the application against the surface of the optical article in step /d/, as a function of a curvature of said surface of the article.

29. The method as claimed in claim 1, additionally comprising a step for treating the surface of the optical article carried out before step /b/.

30. The method as claimed in claim 1, according to which the pressure-sensitive adhesive material is chosen from the family of polyacrylates, the family of styrene-based block copolymers, and mixtures based on natural rubber.

31. The method as claimed in claim 1, according to which the pressure-sensitive adhesive material comprises components that have an optical function chosen from coloring and photochromism.

32. The method as claimed in claim 1, according to which the hollows and the protuberances have dimensions between 10 microns and 50 nanometers measured parallel to the membrane.

33. The method as claimed in claim 1, according to which the depth of the hollows is between 0.1 µm and 30 µm.

34. The method as claimed in claim 1, according to which the application pressure of the stamp to the optical article is between 0.25 and 70 grams per square millimeter of surface area of the protuberances.

* * * * *